United States Patent
Al Qasimi et al.

(10) Patent No.: US 11,496,487 B2
(45) Date of Patent: Nov. 8, 2022

(54) COMPUTING NETWORK FOR USING A CLOUD COMPUTING SERVER TO VERIFY DATA RECEIVED FROM AN OPERATING SYSTEM

(71) Applicant: Shaikh Abdulla Mohamed Khalid Ahmed Al Qasimi, Sharjah (AE)

(72) Inventors: Shaikh Abdulla Mohamed Khalid Ahmed Al Qasimi, Sharjah (AE); Tonye Warmate Anyanwu, Dubai (AE)

(73) Assignee: SHAIKH ABDULLA MOHAMED KHALID AHMED AL QASIMI, Sharjah (AE)

( * ) Notice: Subject to any disclaimer, the term of this patent is extended or adjusted under 35 U.S.C. 154(b) by 0 days.

(21) Appl. No.: 17/711,989

(22) Filed: Apr. 1, 2022

(65) Prior Publication Data

US 2022/0303284 A1 Sep. 22, 2022

Related U.S. Application Data

(63) Continuation-in-part of application No. 17/175,232, filed on Feb. 12, 2021, now abandoned.
(Continued)

(51) Int. Cl.
*G06F 7/04* (2006.01)
*G06F 15/16* (2006.01)
(Continued)

(52) U.S. Cl.
CPC ........ *H04L 63/126* (2013.01); *H04L 63/0807* (2013.01); *H04L 63/0838* (2013.01); *H04L 67/133* (2022.05)

(58) Field of Classification Search
CPC ... H04L 63/126; H04L 63/12; H04L 63/0807; H04L 63/0838; H04L 67/133
See application file for complete search history.

(56) References Cited

U.S. PATENT DOCUMENTS 8,862,660 B1* 10/2014 Fausak ................ H04L 63/0272
709/200
10,509,574 B2* 12/2019 Novak ................ G06F 21/6218
(Continued)

FOREIGN PATENT DOCUMENTS

EP 3779847 A1 2/2021
GB 2573049 A 10/2019
(Continued)

OTHER PUBLICATIONS

International Search Report and Written Opinion dated Jun. 10, 2021 in connection with International Application No. PCT/IB2021/051220, 9 pages.
(Continued)

*Primary Examiner* — Amie C. Lin
(74) *Attorney, Agent, or Firm* — Baker & McKenzie LLP

(57) ABSTRACT

Disclosed herein is a cloud computing server for verifying data received from an operating system. The cloud computing server may receive user and system data, associate such user and system data with user and system accounts, transmit a message to a user device such as a mobile device and receive an acceptance or a rejection from the mobile device based on the transmitted message. The cloud computing server may also associate one or more tokens with user accounts based on the acceptance received from the mobile device. In one embodiment, the user data may include user identification data. The system data may include processing system name, processing system physical address, IP address, MAC address, etc.

19 Claims, 5 Drawing Sheets

Related U.S. Application Data

(60) Provisional application No. 62/976,159, filed on Feb. 13, 2020.

(51) Int. Cl.
    *G06F 17/30*     (2006.01)
    *H04L 29/06*     (2006.01)
    *H04L 9/40*     (2022.01)
    *H04L 67/133*     (2022.01)

(56) References Cited

U.S. PATENT DOCUMENTS

| | | |
|---|---|---|
| 2004/0181470 A1 | 9/2004 | Grounds |
| 2005/0021410 A1 | 1/2005 | Ostlund |
| 2011/0191215 A1 | 8/2011 | Nadler et al. |
| 2015/0026767 A1* | 1/2015 | Sweet .................. H04L 63/20 726/1 |
| 2015/0095204 A1 | 4/2015 | Hammer |
| 2015/0127534 A1 | 5/2015 | Bhambhani |
| 2015/0324767 A1 | 11/2015 | Walsh |
| 2017/0048219 A1* | 2/2017 | Smith .................. G06F 21/00 |
| 2018/0165677 A1 | 6/2018 | Kohli |
| 2019/0108512 A1 | 4/2019 | Radu et al. |
| 2021/0287217 A1 | 9/2021 | Gaddipati |

FOREIGN PATENT DOCUMENTS

| | | |
|---|---|---|
| WO | 0042546 A2 | 7/2000 |
| WO | 2004081839 A2 | 9/2004 |
| WO | 2015121172 A1 | 8/2015 |
| WO | 2016024272 A1 | 2/2016 |
| WO | 2019239199 A1 | 12/2019 |

OTHER PUBLICATIONS

Al Qasimi et al., U.S. Appl. No. 62/976,159, filed Feb. 3, 2020, 106 pages.

Al Qasimi et al., Petry et al., U.S. Appl. No. 17/175,232, filed Feb. 12, 2021, 379 pages.

* cited by examiner

400

RECEIVING FIRST DATA COMPRISING: FIRST IDENTIFICATION DATA FOR A FIRST USER, FIRST COMPUTING OPERATION DATA, AND FIRST SYSTEM LOCATION OR IDENTIFICATION DATA FOR A FIRST OPERATING SYSTEM, WHEREIN THE FIRST IDENTIFICATION DATA COMPRISES OR IS BASED ON A FIRST IMAGE OF A FIRST DIGITAL INDICIA PRESENTED ON A FIRST MOBILE DEVICE OF THE FIRST USER IN PROXIMITY OF A FIRST IMAGE-CAPTURING DEVICE IN COMMUNICATION WITH THE FIRST OPERATING SYSTEM AND CAPTURED BY THE FIRST IMAGE-CAPTURING DEVICE
402

COMPARING THE FIRST IDENTIFICATION DATA TO FIRST REGISTRATION DATA ASSOCIATED WITH A FIRST USER ACCOUNT OF THE FIRST USER OF THE FIRST MOBILE DEVICE TO DETERMINE A FIRST MATCH
404

COMPARING THE FIRST SYSTEM LOCATION OR IDENTIFICATION DATA TO FIRST OPERATING SYSTEM REGISTRATION DATA ASSOCIATED WITH A FIRST OPERATING SYSTEM ACCOUNT FOR THE FIRST OPERATING SYSTEM TO DETERMINE A SECOND MATCH
406

TRANSMITTING A FIRST MESSAGE TO THE FIRST MOBILE DEVICE, THE FIRST MESSAGE PROVIDING A FIRST OPTION TO ACCEPT A FIRST DIGITAL TOKEN
408

IN RESPONSE TO RECEIVING THE ACCEPTANCE OF THE FIRST DIGITAL TOKEN, ASSOCIATING THE FIRST DIGITAL TOKEN WITH THE FIRST USER ACCOUNT OF THE FIRST USER OF THE FIRST MOBILE DEVICE
410

FIG. 4

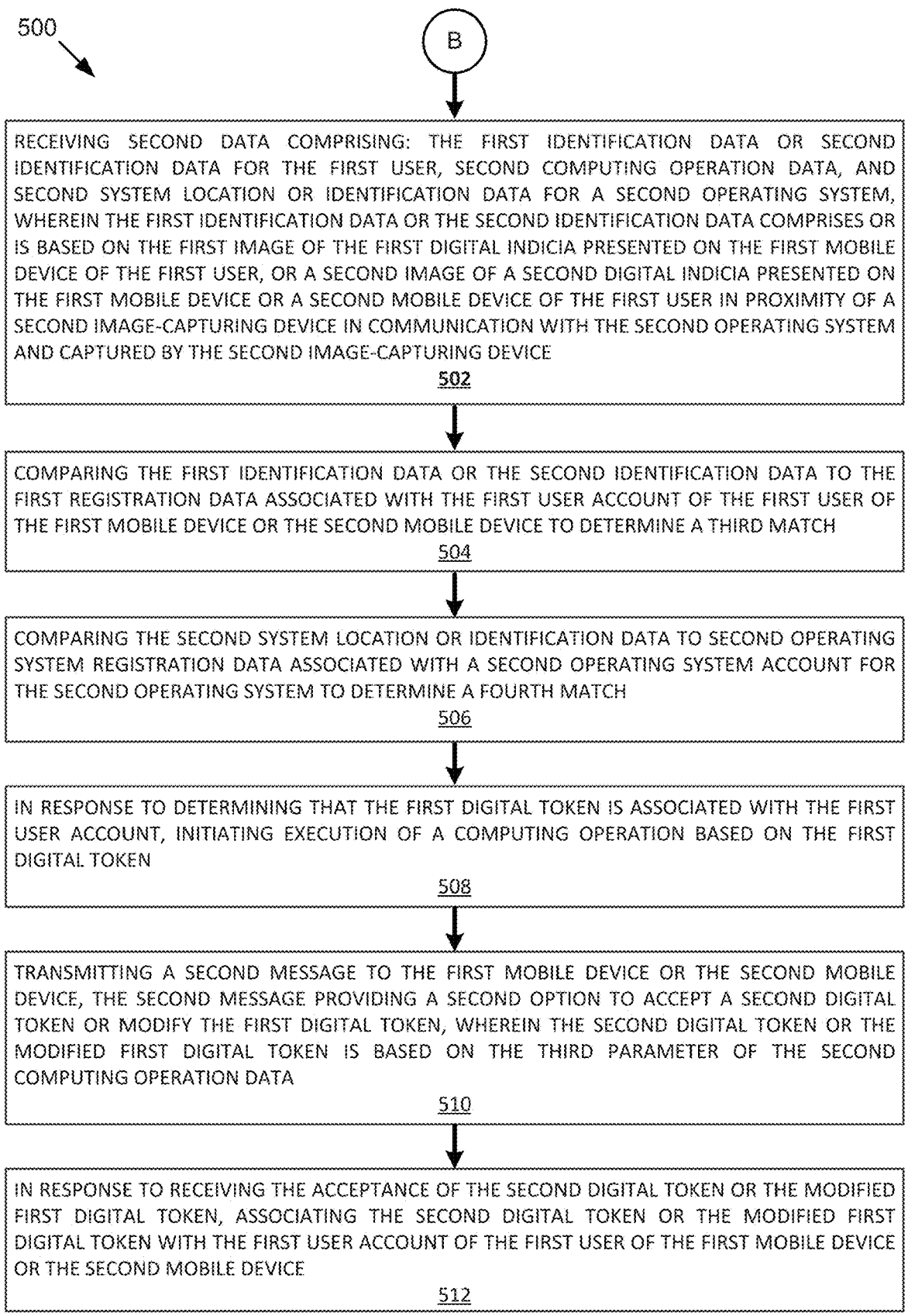

COMPUTING NETWORK FOR USING A CLOUD COMPUTING SERVER TO VERIFY DATA RECEIVED FROM AN OPERATING SYSTEM

TECHNICAL FIELD

The present disclosure relates to systems and methods for verifying or validating data received from an operating system in a complex computing network.

BACKGROUND

There is a need to verify or validate data received from an operating system in real-time or near-real-time.

SUMMARY

Disclosed herein is a cloud computing server for verifying data received from an operating system. By employing the cloud computing server disclosed, operating systems and/or users can seamlessly have information validated and subsequently enhance operations in real-time or near-real-time. In one embodiment, the cloud computing server comprises processors for receiving, from a first operating/processing system at a first location, on a first communication path, first data, wherein the first data comprises first identification data of a first user. The first identification data may also comprise or be based on a first image of a first digital indicia presented on a first mobile device of the first user in proximity of a first image-capturing device in communication with the first operating system. Moreover, the first image is captured by the first image-capturing device. Further, the first data may also include first computing operation data such that the first computing operation data comprises a first parameter and a second parameter. The first data may also include first system location or identification data for the first operating system. The first identification data for the first user is not received at the cloud computing server directly from the first mobile device of the first user. The processors of the cloud computing server may compare the first identification data to first registration data associated with a first user account of a first user of the first mobile device and further compare the first system location or identification data to first operating system registration data associated with a first operating system account for the first operating system. In some embodiments, the processors of the cloud computing server may determine a first match between the first identification data and the first registration data associated with the first user account of the first user of the first mobile device. The cloud computing server may also determine a second match between the first system location or identification data and the first operating system registration data associated with the first operating system account for the first operating system. In response to determining the first match and the second match, the processors of the cloud computing server may transmit a first message to the first mobile device such that the first message provides a first option to accept a first digital token. The first digital token may be based on the first parameter of the first computing operation data. The processors of the cloud computing server may also receive, from the first mobile device, on a second communication path, and not on the first communication path, an acceptance of the first digital token. In response to receiving the acceptance of the first digital token, the cloud computing device may associate the first digital token with the first user account of the first user of the first mobile device.

In one embodiment, the cloud computing server may receive, from a second operating system at a second location, on a third communication path, and not on the first communication path and not on the second communication path, second data, wherein the second data comprises the first identification data or second identification data for the first user. The first identification data or the second identification data may comprise or be based on the first image of the first digital indicia presented on the first mobile device, of the first user, or a second image of a second digital indicia presented on the first mobile device or a second mobile device of the first user in proximity of a second image-capturing device in communication with the second operating system and captured by the second image-capturing device. The cloud computing server may also receive second computing operation data, wherein the second computing operation data comprises a third parameter and a fourth parameter. The cloud computing server may also receive second system location or identification data for the second operating system and compare the first identification data or the second identification data to the first registration data associated with the first user account of the first user of the first mobile device or the second mobile device. The cloud computing server may further compare the second system location or identification data to second operating system registration data associated with a second operating system account for the second operating system. In one embodiment, the cloud computing server may determine a third match between the first identification data, or the second identification data, and the first registration data associated with the first user account of the first user of the first mobile device or the second mobile device. The cloud computing server may also determine a fourth match between the second system location or identification data and the second operating system registration data associated with the second operating system account for the second operating system. In response to determining the third match and the fourth match, the cloud computing server may determine that the first digital token is associated with the first user account. In response to determining that the first digital token is associated with the first user account, the cloud computing server may initiate execution of a computing operation based on the first digital token. In some cases, the cloud computing server may transmit a second message to the first mobile device or the second mobile device, the second message providing a second option to accept a second digital token or modify the first digital token, wherein the second digital token or the modified first digital token is based on the third parameter of the second computing operation data. The cloud computing server may receive, from the first mobile device, on the second communication path, and not on the first communication path and not on the third communication path, or the second mobile device, on a fourth communication path, and not on the first communication path, not on the second communication path, and not on the third communication path, an acceptance of the second digital token or the modified first digital token and in response to receiving the acceptance of the second digital token or the modified first digital token, the cloud computing server may associate the second digital token or the modified first digital token with the first user account of the first user of the first mobile device or the second mobile device.

Other implementations of one or more of these aspects include corresponding method, systems, apparatus, and computer programs, configured to perform the actions of the methods. These and other implementations may each optionally include one or more of the following features. The first digital indicia comprises at least one of a quick response (QR) code, a numeric sequence, or an alphanumeric sequence. Both the first identification data and the first system location or identification data may be received at a first time. In some cases, the first identification data is received at a first time and the first system location or identification data is received at a second time.

In one embodiment, the first message provides a third option to reject the first digital token, such that one or more computing device processors of the cloud computing server are configured to: receive, from the first mobile device, a rejection of the first digital token; and in response to receiving the rejection of the first digital token, generate a data entry comprising an indication of the rejection of the first digital token.

In one embodiment, the first parameter is generated using a first processing operation involving the second parameter, wherein the first digital token is generated based on the first parameter; and the third parameter is generated using the first processing operation involving the fourth parameter, wherein the second digital token is generated based on the third parameter. Moreover, the first computing operation data is based on a first processing operation initiated by the first user on the first operating system; and the second computing operation data is based on a second processing operation initiated by the first user on the second operating system. Furthermore, at least one of the first identification data, the first computing operation data, or the first system location or identification data are transmitted to a compliance system. In addition, the first or second identification data for the first user may comprise at least one of passport data, license data, and flight data.

In one embodiment, at least a portion of the first digital token or the second digital token is used in a third computing operation on a third operating system. The first user account may be associated with the first mobile device and the second mobile device. The first data may be received via one or more application programming interfaces (APIs), and the first digital token or the second digital token is transmitted via the one or more APIs. Furthermore, the first option of the first message may be associated with a visual or an audio indicator. The cloud computing server may further determine the first match and the second match and generate the first digital token based on the first parameter of the first computing operation data. In some embodiments, the first parameter may be determined as a percentage of the second parameter while the first identification data may be transmitted to the first operating system using a wireless transmission protocol.

BRIEF DESCRIPTION OF THE DRAWINGS

The disclosure is illustrated by way of example, and is not intended to otherwise limit the applicability or generality of the figures of the accompanying drawings. In the accompanying drawings, like reference numerals are used to indicate similar elements. It is emphasized that various features may not be drawn to scale and the dimensions of various features may be arbitrarily increased or reduced for clarity of discussion.

FIG. 4 is an exemplary flowchart for verifying first data associated with a user and an operation system, according to some embodiments of this disclosure.

FIG. 5 is an exemplary flowchart for verifying second data associated with a user and the first or second operation system, according to some embodiments of this disclosure.

DETAILED DESCRIPTION

Reference will now be made to various embodiments, examples of which are illustrated in the accompanying drawings and figures. In the following detailed description, numerous specific details are set forth in order to provide a thorough understanding of this disclosure. However, it will be apparent to one of ordinary skill in the art that the disclosure may be practiced without these specific details. In some instances, well-known methods, processes, components, systems and networks have not been described in detail so as to not unnecessarily obscure aspects of the embodiments.

Network and System Environment

Figure 1:
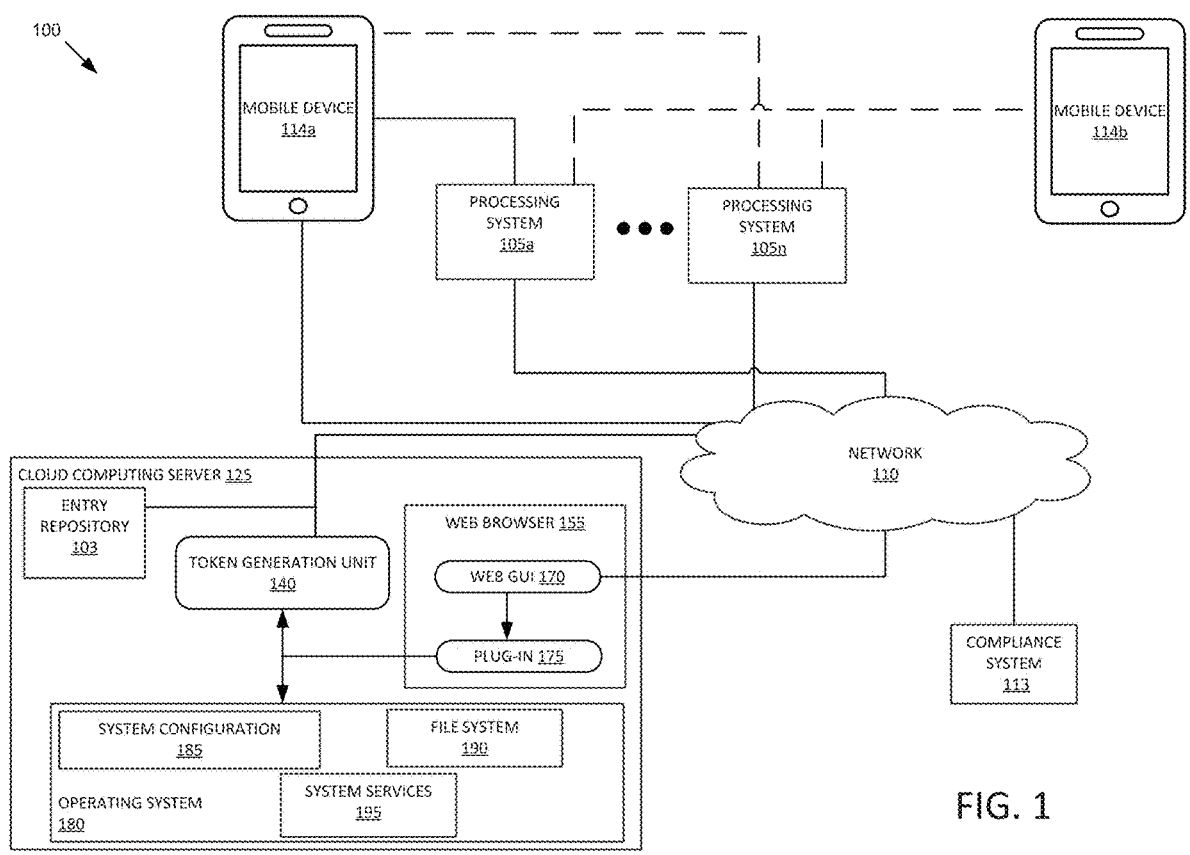
FIG. 1 shows an exemplary complex network system for system and user verification, according to some embodiments of this disclosure.

Illustrated in FIG. 1 is a high level diagram of an example system 100 for executing the principles disclosed herein. In the illustrated implementation, the system 100 may include a plurality of processing systems 105$a$ . . . 105$n$ coupled to a network 110. The system 100 may also include an exemplary cloud computing server 125 and a compliance system 113 communicatively coupled via the network 110. While a single cloud computing server 125 and a single compliance system are illustrated, the disclosed principles and techniques are expandable to multiple cloud computing servers 125 and multiple compliance systems. Also shown in FIG. 1 is are mobile devices 114$a$ and 114$b$ that are communicatively coupled to the network 110 and to one or more processing systems 105$a$ . . . 105$n$.

The processing systems 105$a$ . . . 105$n$ may include a computing device such as a mainframe server, a content server, a communication server, a laptop computer, a desktop computer, a handheld computing device, a smart phone, a touch screen, a biometric device, a video processing device, an audio processing device, an image processing device, an image-capturing, a virtual machine, a cloud-based computing solution and/or service, and/or the like. The processing systems 105$a$ . . . 105$n$, according to some implementations, may include a plurality of computing devices configured to communicate with one or more systems such as the mobile device 114, the cloud computing server 125, and/or with the compliance server 113.

The network 110 may include a plurality of networks. For instance, the network 110 may include any wired and/or wireless communication network that facilitates communication between the processing systems 105$a$ . . . 105$n$, the compliance system 113, and the cloud computing server 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like. In some embodiments, the network 110 may include one or more application programming interfaces (APIs) that configured to facilitate secure communication between the various components shown in FIG. 1.

Returning to FIG. 1, the compliance system 113 may include one or more processors and one or more storage devices that store data, information and instructions for ensuring operational compliance of the various systems discussed in association with FIG. 1. The stored information may include information about users of mobile device 114, information about fraudsters, information about parameters and models used in executing operations on the processing systems 105a . . . 105n, etc. The one or more storage devices mentioned above in association with the compliance system 113 can include non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

Turning back to FIG. 1, the mobile device 114 may be a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server, a virtual server, a virtual machine, and/or a video communication server. In some embodiments, the mobile 114 may include a plurality of computing devices configured to communicate with one another and/or implement the techniques described herein.

The entry repository 103, shown in association with the cloud computing server 125, may include one or more storage devices that store data, information, and instructions used by the cloud computing server 125. According to some embodiments, the entry repository 103 may store data associated with operations executed by the processing systems 105a . . . 105n and/or operations executed by the mobile device 114 and/or operations executed by other devices coupled to the network 110. The stored information may include various logs, flags, acceptance data, rejection data, security event data, etc. associated with operations executed by one or more systems coupled to the network 110.

The one or more storage devices discussed above in association with the local entry repository 103 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis.

The cloud computing server 140 may include a token generation unit 140 that may access an operating system 180 of the cloud computing server 125 in order to execute operations as discussed elsewhere in this disclosure. For instance, the token generation unit 140 may gain access into the operating system in order to execute data comparisons, generate tokens, store records associated with operations of one or more systems of FIG. 1, etc. In some embodiments, the token generation unit 140 may rely on a system configuration 185, a file system 190, and/or system services 195 of the cloud computing server 125 to achieve the operations provided by this disclosure. The plug-in 175 of the web browser 155 may provide needed downloads that facilitate operations executed by the operating system 180, the token generation unit 140, and/or other applications running on the cloud computing server 125.

Figure 2:
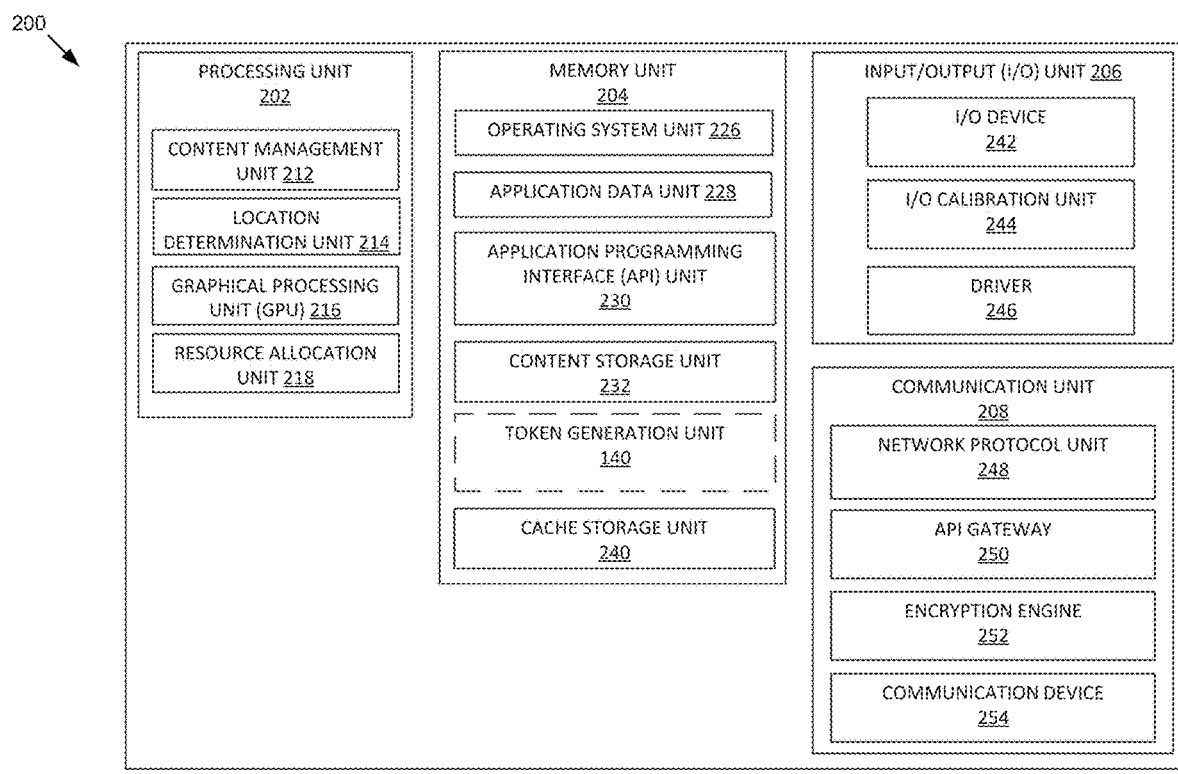
FIG. 2 is a functional block diagram of a computing environment within which is implemented one or more systems or servers discussed in this disclosure.
Figure 3:
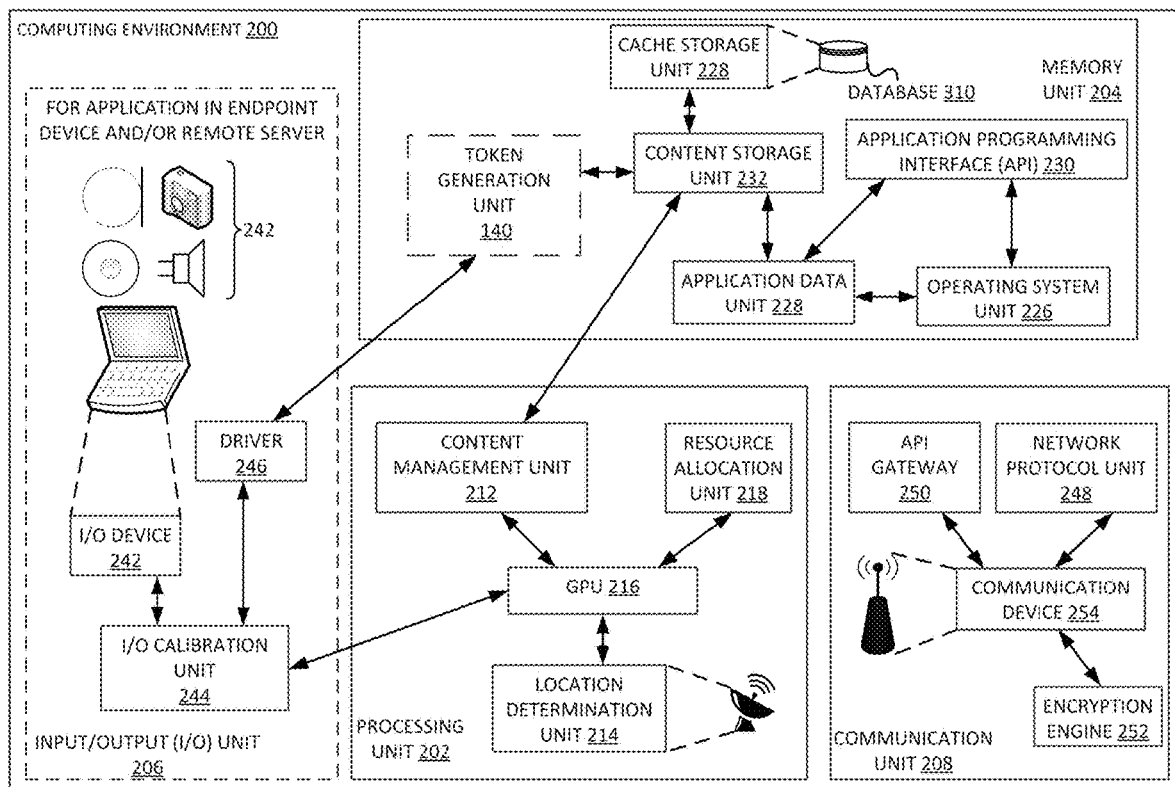
FIG. 3 is a detailed system diagram of the computing environment of FIG. 2, according to some embodiments of this disclosure.

In some instances, the cloud computing server 125 may include various elements of a computing environment as described in, for example, FIG. 2 and/or FIG. 3. For example, elements such as a processing unit 202, a memory unit 204, an input/output (I/O) unit 206, and/or a communication unit 208 may execute one or more of the modules or components of the cloud computing server 125 and/or one or more elements of the processing systems 105a . . . 105n and/or one or more elements of the mobile device 114a or 114b.

FIG. 2 and FIG. 3 illustrate exemplary functional and system diagrams of a computing environment 200, according to some embodiments of this disclosure, for performing the operations described herein. Specifically, FIG. 2 provides a functional block diagram of the computing environment 200, whereas FIG. 3 illustrates a detailed system diagram of the computing environment 200.

As seen in FIG. 2 and FIG. 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described herein. Additionally, each unit and/or subunit may be operatively and/or otherwise communicatively coupled with each other so as to facilitate the operations described herein. The computing environment 200 including any of its units and/or subunits may include general hardware, specifically-purposed hardware, and/or software.

Importantly, the computing environment 200 and any units and/or subunits of FIG. 2 and/or FIG. 3 may be included in one or more elements of system 100 as described with reference to FIG. 1. For example, one or more elements (e.g., units and/or subunits) of the computing environment 200 may be included in the processing systems 105a . . . 105n, mobile devices 114a and 114b, and the cloud computing server 125.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIG. 2 and/or FIG. 3 alone and/or by the processing unit 202 in conjunction with one or more additional processors, units, subunits, elements, components, devices, and/or the like. Further, while one processing unit 202 may be shown in FIG. 2 and/or FIG. 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, malware content, image content, video content, or any combination thereof. In some instances, Content on which the content management unit 212 may operate includes device information, user interface data, image data, text data, themes, audio files, video files, documents, and/or the like. Additionally, the content management unit 212 may control the audio-visual environment and/or appearance of application data during execution of various processes (e.g., via web GUI 170 of the cloud computing server 125). In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information. In some embodiments, the location determination unit may facilitate determining the location of the cloud computing server 125, the locations of the mobile devices 114a and 114b, the location of the compliance system, and the locations of the processing systems 105a . . . 105n.

The GPU 216 may facilitate generation, modification, analysis, processing, transmission, and/or presentation of content described above, as well as any data (e.g., identification data, computing operation data, system location or system identification data, digital indicia data, scanning instructions, token generation instructions, and/or the like) described herein. In some embodiments, the GPU 216 may be used to render content for presentation on a computing device (e.g., via web GUI 170 of the cloud computing server 125 or on the mobile device 114 or on the processing system 105). The GPU 216 may also include multiple GPUs and therefore may be configured to perform and/or execute multiple processes in parallel. In some implementations, the GPU 216 may be used in conjunction with subunits associated with the memory unit 204, the I/O unit 206, and/or the communication unit 208.

The resource allocation unit 218 may facilitate the determination, monitoring, analysis, and/or allocation of computing resources throughout the computing environment 200 and/or other computing environments. For example, the computing environment may facilitate a high volume of data (e.g., data associated with operation of one or more systems of FIG. 1), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation.

For example, the resource allocation unit 218 may determine a number of simultaneous computing processes and/or requests. The resource allocation unit 218 may also determine that the number of simultaneous computing processes and/or requests meets and/or exceeds a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

In some embodiments, factors affecting the allocation of computing resources by the resource allocation unit 218 may include the number of computing processes and/or requests, a duration of time during which computing resources are required by one or more elements of the computing environment 200, and/or the like. In some implementations, computing resources may be allocated to and/or distributed amongst a plurality of second computing environments included in the computing environment 200 based on one or more factors mentioned above. In some embodiments, the allocation of computing resources of the resource allocation unit 218 may include the resource allocation unit 218 flipping a switch, adjusting processing power, adjusting memory size, partitioning a memory element, transmitting data, controlling one or more input and/or output devices, modifying various communication protocols, and/or the like. In some embodiments, the resource allocation unit 218 may facilitate utilization of parallel processing techniques such as dedicating a plurality of GPUs included in the processing unit 202 for running a multitude of processes.

The memory unit 204 may be used for storing, recalling, receiving, transmitting, and/or accessing various files and/or data (e.g., identification data, computing operation data, system location or system identification data, digital indicia data, scanning instructions, token generation instructions, and/or the like) during operation of computing environment 200. For example, memory unit 204 may be used for storing, recalling, and/or updating data associated with, resulting from, and/or generated by any unit, or combination of units and/or subunits of the computing environment 200. In some embodiments, the memory unit 204 may store instructions, code, and/or data that may be executed by the processing unit 201. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases (e.g., the public record repository 113 discussed with reference to FIG. 1) located remotely from computing environment 200 may be used and/or accessed by memory unit 204. In some embodiments, memory unit 204 and/or its subunits may be local to the processing systems 105*a* . . . 105*n* and/or the cloud computing server 125 and/or the mobile device 114 and/or the compliance system 113. In other embodiments, the memory unit 204 may be remotely located in relation to the various systems of FIG. 1.

Turning back to FIG. 2, the memory unit 204 may include subunits such as an operating system unit 226, an application data unit 228, an application programming interface 230, a content storage unit 232, token generation unit 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described herein. For instance, the memory unit 204 may include one or more modules such as a receiving module, a mapping or comparison module, a determining module, a sequencing module, a parsing module, a visualization module, etc., that comprise instructions executable by one or more computing device processors to accomplish the steps in the flowcharts of FIG. 4 and FIG. 5.

The operating system unit 226 may facilitate deployment, storage, access, execution, and/or utilization of an operating system used by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or usage of an application used by computing environment 200 and/or any other computing environment described herein. For example, the cloud computing server 125 may be required to download, install, access, and/or otherwise use a software application (e.g., web application 165) to facilitate performance of the operations discussed in conjunction with FIGS. 4 and 5. As such, application data unit 228 may store any information and/or data associated with an application. Application data unit 228 may further store various pieces of information and/or data associated with the operation of an application and/or computing environment 200 as a whole, such as a status of computing resources, runtime information, user interfaces, modules to direct execution of operations described herein, user permissions, security credentials, and/or the like.

The application programming interface (API) unit 230 may facilitate deployment, storage, access, execution, and/or usage of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the cloud computing server 105, the processing systems 105*a* . . . 105*n*, the mobile devices 114*a* and 114*b*, and the compliance system 113 to securely communicate with each other.

The content storage unit 232 may facilitate deployment, storage, access, and/or usage of information associated with performance of the various processes executed by computing environment 200 and/or any other computing environments. In some embodiments, content storage unit 232 may communicate with content management unit 212 to receive and/or transmit data.

Token generation unit 140 may include one or more modules that facilitate user and processing system verifications. According to some embodiments, the token generation unit may also facilitate generation of one or more tokens as further discussed in association with FIGS. 4 and 5. It is appreciated that the token generation unit 140 is shown in dashed lines to indicate implementations where the cloud computing server 125 is implemented using the computing environment 200.

The cache storage unit 240 may facilitate short-term deployment, storage, access, analysis, and/or usage of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the processes described herein. For example, elements of the I/O unit 206 may be used to receive data from a user of the mobile device 114, for example. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, an image-scanning device, a video recording device, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to and from a user. In some embodiments, the I/O device 242 may communicate with one or more elements of processing unit 202 and/or memory unit 204 to execute operations associated FIGS. 4 and 5.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may use a driver 246 (or multiple drivers) to calibrate I/O device 242. For example, driver 246 may include software that is to be installed by I/O calibration unit 244 so that an element of computing environment 200 (or an element of another computing environment) may recognize and/or integrate with I/O device 242 for the malware scanning operations and/or framework processes described herein.

The communication unit 208 may facilitate establishment, maintenance, monitoring, and/or termination of communications between computing environment 200 and other computing environments, third party server systems, and/or the like. For example, the communication unit 208 may facilitate communication between the various systems shown in FIG. 1. Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, network protocol unit 248 may detect and/or define a communication protocol required by a particular network and/or network type. Communication protocols utilized by network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing malware scanning operations and/or other processes described herein.

The application programming interface (API) gateway 250 may facilitate other devices and/or computing environments to access API unit 230 of memory unit 204 of computing environment 200. For example, an endpoint device 125 may access API unit 230 of computing environment 200 via API gateway 250. In some embodiments, API gateway 250 may be required to validate or otherwise confirm user identification data, system identification data, user credential data, etc., prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. In some cases, the communication device 254 may include hardware and/or software configured for near field communication between, for example, the mobile device 114 and the processing system 105. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Workflows

FIG. 4 shows an exemplary flowchart for s for verifying data received from an operating system. At 402, the token generation unit 140 may be used to receive, from a first operating/processing system (e.g., processing system 105a) at a first location, first data on a first communication path. The communication path (e.g., first communication path, second communication path, third communication path, fourth communication path, etc. discussed elsewhere herein) may be unidirectional or bidirectional as the case may be. The first data may include first identification data for a first user that comprises or is based on a first image of a first digital indicia presented on a first mobile device (e.g., mobile device 114a) of the first user in proximity of a first image-capturing device in communication with the first operating system and captured by the first image-capturing device. The first data may also include first computing operation data such that the first computing operation data comprises a first parameter and a second parameter. Moreover, the first data may further include first system location or identification data for the first operating/processing system. It is appreciated that the first identification data for the first user is not received at the cloud computing server directly from the first mobile device of the first user. As previously discussed in association with the computing environment 200, the first processing/operating system may include or be coupled to the first image-capturing device as the case may be. Moreover, the first digital indicia may also be captured using some other optical scanner or with a video or audio capturing device. According to some embodiments, the first digital indicia may comprise at least quick response (QR) code, a numeric sequence, a bar code, an alphanumeric sequence, a hash sequence, a hash value, an image, a code sequence, etc.

At 404, the token generation unit 140 may be used to compare the first identification data to first registration data associated with a first user account of a first user of the first mobile device. Registration data associated with the first user account of the first user of the first mobile device may be previously captured and stored in, for example, storage media of the cloud computing server 125 such that the captured first identification data is compared with this registration data. In one implementation, data of the first user such as passport data, or driver's license data, or biometric data, or social security data, or birth certificate data, or travel history data of the first user may be used to generate the registration data for the first user account. According to some embodiments, the registration data for the first user account may be transformed into an identifier for the first user. The identifier for the first user, according to some implementations may include a QR code, a bar code, a numeric sequence, an alphanumeric sequence, a hash sequence, a hash value, an image, a code sequence, an audio containing file, a video containing file, etc.

At 406, the token generation unit 140 may be used to compare the first system location or system identification (simply referred to as first system location or identification) data to first operating system registration data associated with a first operating system account for the first operating/processing system. Registration data associated with the first operating system account of the first operating/processing system may be previously captured and stored in, for example, storage media of the cloud computing server 125 such that the captured first system location or identification data is compared with this registration data. In one implementation, data (e.g., first system location or identification data) of the first processing/operating system may include processing system name, processing system location, processing system type, processing system IP address, processing system physical address, processing system media access control (MAC) address, processing system operator information, etc. According to some embodiments, the registration data for the first operating system account may be transformed into an identifier for the first operating. The identifier for the first operating system, according to some implementations may include a QR code, a numeric sequence, an alphanumeric sequence, a hash sequence, a hash value, an image, a code sequence, an audio containing file, a video containing file, etc.

As a result of the comparisons discussed in association with 404 and 406 above, the token generation unit 140 may determine a first match between the first identification data and the first registration data associated with the first user account of the first user of the first mobile device. The token generation unit 140 may also determine a second match between the first system location or identification data and the first operating system registration data associated with the first operating system account for the first operating system. In response to determining the first match and the second match, the token generation unit 140 may transmit, at 408, a first message to the first mobile device. The first message may provide a first option to the first user to accept a first digital token such that the first digital token is based on the first parameter of the first computing operation data. According to some implementations, the first message may comprise a visualization that may be displayed on a display device coupled to the mobile device 114. This visualization may include one or more options that may be selected or otherwise activated by the first user to indicate an acceptance or a rejection of the first digital token. This acceptance or rejection may be received via on a second communication path, and not on the first communication path. In response to receiving the acceptance of the first digital token, the token generation unit 140 may associate, at 410, the first digital token with the first user account of the first user of the first mobile device.

FIG. 5 is an exemplary flowchart for verifying second data associated with a user and the first or second operation system. At 502, the token generation unit 140 may be used to receive, from a second operating/processing system (e.g., processing system 105n) at a second location, on a third communication path, and not on the first communication path and not on the second communication path, second data that may comprise the first identification data or second identification data for the first user. The first identification data or the second identification data may include or be based on the first image of the first digital indicia presented on the first mobile device, of the first user discussed in association with FIG. 4. The first identification data, according to some embodiments, may be based on a second image of a second digital indicia presented on the first mobile device (e.g., mobile device 114a) or a second mobile device (e.g., mobile device 114b) of the first user in proximity of a second image-capturing device in communication with the second operating/processing system (e.g., processing system 105n) and captured by the second image-capturing device. In some cases, the second data may include second computing operation data that includes a third parameter and a fourth parameter. According to some implementations, the second data may include second system location or system identification data for the second operating system. In some cases, the digital indicia may be used to generate an image of the user by the cloud computing server 140. This image may be displayable on a display device of the processing system 105, a display device of the mobile device 114, or a display device of the compliance system 113. This image of the user and/or captured first or second digital indicia may be used, according to some embodiments, to ensure the validity or otherwise a legality associated with computing operations executed by the processing system 105 and or computing operations executed by the cloud computing server 125.

At 504, the token generation unit 140 may be used to compare the first identification data or the second identification data to the first registration data associated with the first user account of the first user of the first mobile device or the second mobile device. The token generation unit 140 may also be used to compare, at 506, the second system location or identification data to second operating system registration data associated with a second operating system account for the second operating system. The system location or system identification data are similar to the system location and system identification data discussed in association with FIG. 4. In addition, the second identification data of the first user is similar to the first identification data discussed in association with FIG. 4. The token generation unit 140 may further be used to determine a third match between the first identification data, or the second identification data, and the first registration data associated with the first user account of the first user of the first mobile device or the second mobile device. Moreover, the token generation unit 140 may be used to determine a fourth match between the second system location or identification data and the second operating system registration data associated with the second operating system account for the second operating system. In response to determining the third match and/or the fourth match, the token generation unit may be used to determine that the first digital token is associated with the first user account. According to some embodiments, in response to determining that the first digital token is associated with the first user account, the token generation unit may be used to initiate, at 508, execution of a computing operation based on the first digital token.

At 510, the token generation unit 140 may be used to transmit a second message to the first mobile device or to the second mobile device. The second message may provide a second option to accept a second digital token or modify the first digital token. In some embodiments, the second digital token or the modified first digital token may be based on the third parameter of the second computing operation data. The token generation unit 140 may receive from the first mobile device, on the second communication path, and not on the first communication path and not on the third communication path, or the second mobile device, on a fourth communication path, and not on the first communication path, not on the second communication path, and not on the third communication path, an acceptance of the second digital token or the modified first digital token. In response to receiving the acceptance of the second digital token or the modified first digital token, the token generation unit may associate, at 512, the second digital token or the modified first digital token with the first user account of the first user of the first mobile device or the second mobile device.

In some embodiments, the first identification data and the first system location or system identification data are received at a first time. The first identification data may be received, in some instances, at a first time and the first system location or system identification data is received at a second time. Thus, the time of reception of the first identification data and the first system location or system identification may be at the same time or at a different time as the case may be. Furthermore, the first message discussed in association with FIG. 4 may provide a third option that allows the user of the first mobile device to reject the first digital token such that the token generation unit 140 may receive, from the first mobile device, a rejection of the first digital token. In response to receiving the rejection of the first digital token, the token generation unit may be used to generate a data entry comprising an indication of the rejection of the first digital token. This data entry may be stored in, for example, the entry repository 103 of FIG. 1. In some cases, the first parameter may be generated using a first processing operation involving the second parameter. Similarly, the third parameter may be generated using the first processing operation involving the fourth parameter. It is appreciated that the second digital token is generated based on the third parameter. According to one embodiment, the first computing operation data may be based on a first processing operation initiated by the first user on the first operating system while the second computing operation data is based on a second processing operation initiated by the first user on the second operating system. Furthermore, at least one of the first identification data, the first computing operation data, or the first system location or identification data may be transmitted to a compliance system. The first or second identification data for the first user may include passport data, license data (e.g., driver's license data), and flight data (e.g., itinerary data), biometric data of the first user, and other personal or biometric information data of the first user. In some cases, the first identification data for the first user is not received at the one or more computing device processors directly from the first mobile device of the first user.

This application is a continuation-in-part of and incorporates by reference, in its entirety, U.S. patent application Ser. No. 17/175,232 filed on Feb. 12, 2021, which is a non-provisional of U.S. Provisional Patent Application No. 62/976,159 filed on Feb. 13, 2020. The contents of U.S. Provisional Patent Application No. 62/976,159 are also incorporated by reference in its entirety.

In some embodiments, at least a portion of the first digital token or a portion of the second digital token may be used in a third computing operation on a third operating/processing system. In such cases, the third operating/processing system would have been previously registered with the cloud computing server 125. Moreover, the first user account may be associated with the first mobile device and the second mobile device. The first data may be received via one or more application programming interfaces (APIs) and the first digital token or the second digital token may be transmitted via the one or more APIs. In addition, the first option of the first message (and similarly the second message discussed elsewhere herein) may be associated with a visual or an audio indicator. This visual or audio indicator may include an option that allows the first user to activate a physical button (e.g., a button on the first mobile device) or virtual button (e.g., an icon or display button) on a display device of the mobile device of the first user. In response to determining the first match and the second match, the token generation unit 140 may be further used to generate the first digital token based on the first parameter of the first computing operation data. In some cases, the first parameter may be determined as a percentage of the second parameter. Moreover, it is appreciated that the first and third parameters discussed in association with flowcharts 4 and 5 could be one or more of programmable jurisdiction-specific rules or one or more programmable jurisdiction-specific tax values. In some embodiments, the first or third parameters can be at least one of an amount, a percentage of an amount, a tax per item purchased, a total tax of all items purchased, a tax refund value (e.g., per item or total tax refund for a shopping instance or session (e.g., at a physical store, over the Internet, etc.)), duration-specific value or percentage, a jurisdiction-specific value or percentage, or a weight. A value of the first digital token may be equal to a value of the first parameter (e.g., in the local currency). In some embodiments, a modification of the first digital token may be based on the third parameter. In some embodiments, a value of the second digital token may be equal to a value of the third parameter (e.g., in the local currency). In one embodiment, the first or third parameters (e.g., their values) may be based on a location of the operating/processing system. In some embodiments the second or fourth parameters may include at least one of a value, a total price of items purchased, a price, a price per item, or a location-specific cost. The operating/processing system may be at least one of a mobile device, a laptop, a point of sale system, a kiosk, or a self-serving electronic system, or any computing system that is used at a point of verification (e.g., at a point where both the operating system and user or user's mobile device need to be verified). In some embodiments, the point of verification may be a physical point of verification in a physical store near a point-of-sale terminal (POS) or kiosk. The point of verification may be at least one of before, after, or during execution of a purchase transaction at a POS terminal (e.g., before, after, or during a payment is processed for the items being purchased at the POS terminal), Moreover, the first or second computing operation data may include or be associated with at least one of a verification operation/process executed on an operating/processing system 105 associated with the cloud computing server 125, a verification operation/process executed on a mobile device 114 associated with the cloud computing server 125, a transaction executed on at least the operating system 105 and/or the mobile device 114, or a data entry process associated with or otherwise executed by the operating system 105 and/or the mobile device 114. In some embodiments, the first digital token may be generated, updated, or modified based on the first parameter and/or the third parameter. In some embodiments, the second digital token may be generated, updated, or modified based on the third parameter. Alternatively, the first or second digital token may be generated, updated, or modified based on at least one of the first parameter, the second parameter, third parameter, or the fourth parameter. Further, the first or second digital token may comprise one or more of a value regulated or determined by one or more parameters, a parameterized digital asset, or a platform-specific value system associated with the cloud computing server 125, or a storable value associated with a digital engine or a smart engine of the mobile device 114. According to some embodiments, the cloud computing server may generate or otherwise transmit a plurality of digital tokens other than the first or second digital token. In some embodiments, a communication path may be a one way communication path from one device or system to another device or system such that data can only flow in one direction from one device or system to the other device or system. In other embodiments, a communication path may be a two way communication path between two separate devices or systems such that they can send data to or receive data from each other.

In some alternative embodiments, the identification data may be transmitted from the mobile device to the operating system using a wired or wireless transmission protocol such as Near-field communication (NFC), or other transmission protocols such as: WirelessHART; Dash7; DigiMesh; ANT and ANT+; Weightless-P; Weightless-N; Ingenu; LoRaWAN; SigFox; RFID; 5G; NB-IoT; LTE-M1; LTE Cat 0, 1, and 3; 3G and 4G; 2G (GSM); WiFi-ah (HaLow); Thread; 6LoWPAN; Z-Wave; ZigBee; Bluetooth LE; and Bluetooth are also herein contemplated as possible protocols for such a transmission.

The above description has been written with reference to specific embodiments. However, the illustrative discussions above are not intended to be exhaustive; neither do they limit this disclosure to the precise forms presented. Many modifications and variations are possible in view of the above teachings. The embodiments were chosen and described in order to explain the principles of the present disclosure and its practical applications, to thereby enable others skilled in the art to utilize the principles described and various embodiments with various modifications as suited to the particular use contemplated.

What is claimed is:

1. A cloud computing server for verifying data received from an operating system, comprising a memory, and one or more computing device processors for:

receiving, from a first operating system at a first location, first data, on a first communication path, wherein the first data comprises:
first identification data for a first user, wherein the first identification data comprises or is based on a first image of a first digital indicia presented on a first mobile device of the first user in proximity of a first image-capturing device in communication with the first operating system and captured by the first image-capturing device,
first computing operation data, wherein the first computing operation data comprises a first parameter and a second parameter, and
first system location or identification data for the first operating system;
wherein the first identification data for the first user is not received at the cloud computing server directly from the first mobile device of the first user;
comparing the first identification data to first registration data associated with a first user account of the first user of the first mobile device;
comparing the first system location or identification data to first operating system registration data associated with a first operating system account for the first operating system;
determining a first match between the first identification data and the first registration data associated with the first user account of the first user of the first mobile device;
determining a second match between the first system location or identification data and the first operating system registration data associated with the first operating system account for the first operating system;
in response to determining the first match and the second match, transmitting a first message to the first mobile device, the first message providing a first option to accept a first digital token, wherein the first digital token is based on the first parameter of the first computing operation data;

receiving, from the first mobile device, on a second communication path, and not on the first communication path, an acceptance of the first digital token;

in response to receiving the acceptance of the first digital token, associating the first digital token with the first user account of the first user of the first mobile device;

receiving, from a second operating system at a second location, on a third communication path, and not on the first communication path and not on the second communication path, second data, wherein the second data comprises:

the first identification data or second identification data for the first user, wherein the first identification data or the second identification data comprises or is based on the first image of the first digital indicia presented on the first mobile device, of the first user, or a second image of a second digital indicia presented on the first mobile device or a second mobile device of the first user in proximity of a second image-capturing device in communication with the second operating system and captured by the second image-capturing device, second computing operation data, wherein the second computing operation data comprises a third parameter and a fourth parameter, and second system location or identification data for the second operating system;

comparing the first identification data or the second identification data to the first registration data associated with the first user account of the first user of the first mobile device or the second mobile device;

comparing the second system location or identification data to second operating system registration data associated with a second operating system account for the second operating system;

determining a third match between the first identification data, or the second identification data, and the first registration data associated with the first user account of the first user of the first mobile device or the second mobile device;

determining a fourth match between the second system location or identification data and the second operating system registration data associated with the second operating system account for the second operating system;

in response to determining the third match and the fourth match, determining that the first digital token is associated with the first user account;

in response to determining that the first digital token is associated with the first user account, initiating execution of a computing operation based on the first digital token;

transmitting a second message to the first mobile device or the second mobile device, the second message providing a second option to accept a second digital token or modify the first digital token, wherein the second digital token or the modified first digital token is based on the third parameter of the second computing operation data;

receiving, from the first mobile device, on the second communication path, and not on the first communication path and not on the third communication path, or from the second mobile device, on a fourth communication path, and not on the first communication path, not on the second communication path, and not on the third communication path, an acceptance of the second digital token or the modified first digital token; and in response to receiving the acceptance of the second digital token or the modified first digital token, associating the second digital token or the modified first digital token with the first user account of the first user of the first mobile device or the second mobile device.

2. The cloud computing server of claim 1, wherein the first digital indicia comprises at least one of a quick response (QR) code, a numeric sequence, or an alphanumeric sequence.

3. The cloud computing server of claim 1, wherein both the first identification data and the first system location or identification data are received at a first time.

4. The cloud computing server of claim 1, wherein the first identification data is received at a first time and the first system location or identification data is received at a second time.

5. The cloud computing server of claim 1, wherein:
the first message provides a third option to reject the first digital token, the one or more computing device processors are configured to:
receive, from the first mobile device, a rejection of the first digital token;
in response to receiving the rejection of the first digital token, generate a data entry comprising an indication of the rejection of the first digital token.

6. The cloud computing server of claim 1, wherein:
the first parameter is generated using a first processing operation involving the second parameter, wherein the first digital token is generated based on the first parameter, and
the third parameter is generated using the first processing operation involving the fourth parameter, wherein the second digital token is generated based on the third parameter.

7. The cloud computing server of claim 1, wherein:
the first computing operation data is based on a first processing operation initiated by the first user on the first operating system; and
the second computing operation data is based on a second processing operation initiated by the first user on the second operating system.

8. The cloud computing server of claim 1, wherein at least one of the first identification data, the first computing operation data, or the first system location or identification data are transmitted to a compliance system.

9. The cloud computing server of claim 1, wherein the first identification data for the first user comprises at least one of passport data, license data, and flight data.

10. The cloud computing server of claim 1, wherein at least a portion of the first digital token or the second digital token is used in a third computing operation on a third operating system.

11. The cloud computing server of claim 1, wherein the first user account is associated with the first mobile device and the second mobile device.

12. The cloud computing server of claim 1, wherein:
the first data is received via one or more application programming interfaces (APIs), and
the first digital token or the second digital token is transmitted via the one or more APIs.

13. The cloud computing server of claim 1,
wherein the wherein the first message is transmitted to the first mobile device on the second communication path or on a fifth communication path, and wherein the second message is transmitted to the first mobile device on the second communication path or on the fifth communication path, or to the second mobile device on the fourth communication path or on a sixth communication path.

14. The cloud computing server of claim 1, further comprising in response to determining the first match and the second match, generating the first digital token based on the first parameter of the first computing operation data.

15. The cloud computing server of claim 1, wherein the first parameter is determined as a percentage of the second parameter.

16. The cloud computing server of claim 1, wherein the first identification data is transmitted to the first operating system using a wireless transmission protocol.

17. A method for verifying data received from an operating system, the method comprising:

receiving, using one or more computing device processors, from a first operating system at a first location, on a first communication path, first data, wherein the first data comprises:

first identification data for a first user, wherein the first identification data comprises or is based on a first image of a first digital indicia presented on a first mobile device of the first user in proximity of a first image-capturing device in communication with the first operating system and captured by the first image-first computing operation data, wherein the first computing operation data comprises a first parameter and a second parameter, and first system location or identification data for the first operating system, wherein the first identification data for the first user is not received at the one or more computing device processors directly from the first mobile device of the first user;

comparing, using the one or more computing device processors, the first identification data to first registration data associated with a first user account of the first user of the first mobile device;

comparing, using the one or more computing device processors, the first system location or identification data to first operating system registration data associated with a first operating system account for the first operating system;

determining, using the one or more computing device processors, a first match between the first identification data and the first registration data associated with the first user account of the first user of the first mobile device;

determining, using the one or more computing device processors, a second match between the first system location or identification data and the first operating system registration data associated with the first operating system account for the first operating system;

in response to determining the first match and the second match, transmitting, using the one or more computing device processors, a first message to the first mobile device, the first message providing a first option to accept a first digital token, wherein the first digital token is based on the first parameter of the first computing operation data;

receiving, using the one or more computing device processors, from the first mobile device, on a second communication path, and not on the first communication path, an acceptance of the first digital token;

in response to receiving the acceptance of the first digital token, associating, using the one or more computing device processors, the first digital token with the first user account of the first user of the first mobile device;

receiving, using the one or more computing device processors, from a second operating system at a second location, on a third communication path, and not on the first communication path and not on the second communication path, second data, wherein the second data comprises:

the first identification data or second identification data for the first user, wherein the first identification data or the second identification data comprises or is based on the first image of the first digital indicia presented on the first mobile device, of the first user, or a second image of a second digital indicia presented on the first mobile device or a second mobile device of the first user in proximity of a second image-capturing device in communication with the second operating system and captured by the second image-capturing device, second computing operation data, wherein the second computing operation data comprises a third parameter and a fourth parameter, and second system location or identification data for the second operating system;

comparing, using the one or more computing device processors, the first identification data or the second identification data to the first registration data associated with the first user account of the first user of the first mobile device or the second mobile device;

comparing, using the one or more computing device processors, the second system location or identification data to second operating system registration data associated with a second operating system account for the second operating system;

determining, using the one or more computing device processors, a third match between the first identification data, or the second identification data, and the first registration data associated with the first user account of the first user of the first mobile device or the second mobile device;

determining, using the one or more computing device processors, a fourth match between the second system location or identification data and the second operating system registration data associated with the second operating system account for the second operating system;

in response to determining the third match and the fourth match, determining, using the one or more computing device processors, that the first digital token is associated with the first user account;

in response to determining that the first digital token is associated with the first user account, initiating execution, using the one or more computing device processors, of a computing operation based on the first digital token;

transmitting, using the one or more computing device processors, a second message to the first mobile device or the second mobile device, the second message providing a second option to accept a second digital token or modify the first digital token, wherein the second digital token or the modified first digital token is based on the third parameter of the second computing operation data;

receiving, using the one or more computing device processors, from the first mobile device, on the second communication path, and not on the first communication path and not on the third communication path, or from the second mobile device, on a fourth communication path, and not on the first communication path, not on the second communication path, and not on the third communication path, an acceptance of the second digital token or the modified first digital token; and in response to receiving the acceptance of the second digital token or the modified first digital token, associating, using the one or more computing device processors, the second digital token or the modified first digital token with the first user account of the first user of the first mobile device or the second mobile device.

18. The method of claim 17, wherein the one or more computing device processors are comprised in or comprise at least one of a cloud computing apparatus, the first mobile device, the first operating system, the second mobile device, or the second operating system.

19. The method of claim 17, wherein the first identification data for the first user comprises at least one of passport data, license data, and flight data.

* * * * *